(12) United States Patent
Shuster

(10) Patent No.: US 8,321,202 B2
(45) Date of Patent: *Nov. 27, 2012

(54) METHOD AND SYSTEM FOR CANDIDATE MATCHING

(75) Inventor: Gary Stephen Shuster, Fresno, CA (US)

(73) Assignee: Hoshiko LLC, Henderson, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/430,238

(22) Filed: Mar. 26, 2012

(65) Prior Publication Data

US 2012/0185251 A1    Jul. 19, 2012

Related U.S. Application Data

(63) Continuation of application No. 12/902,061, filed on Oct. 11, 2010, now Pat. No. 8,150,680, which is a continuation of application No. 11/159,484, filed on Jun. 22, 2005, now Pat. No. 7,813,917.

(60) Provisional application No. 60/582,231, filed on Jun. 22, 2004.

(51) Int. Cl.
G06F 17/27     (2006.01)
G06F 17/00     (2006.01)
G06N 5/00      (2006.01)
G06N 7/04      (2006.01)

(52) U.S. Cl. .................. 704/9; 706/45; 706/54

(58) Field of Classification Search ........ 704/9; 706/45, 706/54

See application file for complete search history.

(56) References Cited

U.S. PATENT DOCUMENTS

| | | | |
|---|---|---|---|
| 4,468,204 A | 8/1984 | Scott et al. | |
| 5,066,016 A * | 11/1991 | O'Neill | 273/249 |
| 5,696,981 A | 12/1997 | Shovers | |
| 5,754,938 A | 5/1998 | Herz et al. | |
| 5,790,645 A | 8/1998 | Fawcett et al. | |
| 5,907,597 A * | 5/1999 | Mark | 379/93.03 |
| 5,937,387 A | 8/1999 | Summerell et al. | |
| 5,995,590 A * | 11/1999 | Brunet et al. | 379/52 |
| 6,182,218 B1 * | 1/2001 | Saito | 713/176 |
| 6,272,457 B1 * | 8/2001 | Ford et al. | 704/9 |
| 6,272,467 B1 | 8/2001 | Durand et al. | |
| 6,721,734 B1 | 4/2004 | Subasic et al. | |
| 6,748,353 B1 * | 6/2004 | Iliff | 704/9 |
| 6,782,510 B1 * | 8/2004 | Gross et al. | 715/257 |
| 6,865,546 B1 | 3/2005 | Song | |
| 6,910,129 B1 * | 6/2005 | Deng et al. | 713/171 |
| 6,978,115 B2 * | 12/2005 | Whitehurst et al. | 434/350 |
| 6,996,520 B2 * | 2/2006 | Levin | 704/10 |
| 7,058,566 B2 * | 6/2006 | Shaw | 704/9 |
| 7,143,089 B2 * | 11/2006 | Petras et al. | 707/749 |
| 7,188,358 B1 * | 3/2007 | Hisada et al. | 726/2 |
| 7,200,635 B2 * | 4/2007 | Yashchin et al. | 709/206 |
| 7,210,163 B2 | 4/2007 | Stoll | |
| 7,212,985 B2 | 5/2007 | Sciuk | |
| 7,346,541 B1 | 3/2008 | Cuttler et al. | |
| 7,444,403 B1 * | 10/2008 | Packer et al. | 709/224 |
| 7,447,635 B1 * | 11/2008 | Konopka et al. | 704/275 |
| 7,487,089 B2 * | 2/2009 | Mozer | 704/246 |
| 7,519,529 B1 * | 4/2009 | Horvitz | 704/7 |
| 7,519,562 B1 | 4/2009 | Vander Mey et al. | |
| 7,593,854 B2 * | 9/2009 | Belrose | 704/270.1 |

(Continued)

Primary Examiner — Eric Yen

(57) ABSTRACT

A method and system for candidate matching, such as used in match-making services, assesses narrative responses to measure candidate qualities. A candidate database includes self-assessment data and narrative data. Narrative data concerning a defined topic is analyzed to determine candidate qualities separate from topical information. Candidate qualities thus determined are included in candidate profiles and used to identify desirable candidates.

27 Claims, 1 Drawing Sheet

U.S. PATENT DOCUMENTS

| | | | |
|---|---|---|---|
| 7,630,961 B2 * | 12/2009 | Middelfart | 1/1 |
| 7,774,334 B2 * | 8/2010 | Thorn | 707/708 |
| 7,792,258 B1 * | 9/2010 | Smith et al. | 379/142.15 |
| 7,805,431 B2 * | 9/2010 | Siegel | 707/708 |
| 7,860,222 B1 * | 12/2010 | Sidler et al. | 379/32.01 |
| 7,881,933 B2 * | 2/2011 | Witzman | 704/250 |
| 7,933,399 B2 * | 4/2011 | Knott et al. | 379/265.02 |
| 8,073,807 B1 * | 12/2011 | Srinivasaiah | 706/62 |
| 8,145,474 B1 * | 3/2012 | Daily et al. | 704/9 |
| 8,159,504 B2 * | 4/2012 | Chang et al. | 345/619 |
| 8,185,646 B2 * | 5/2012 | Headley | 709/229 |
| 2001/0049597 A1 * | 12/2001 | Klipstein | 704/200.1 |
| 2001/0049620 A1 | 12/2001 | Blasko | |
| 2002/0029157 A1 * | 3/2002 | Marchosky | 705/3 |
| 2002/0042748 A1 * | 4/2002 | Nakata et al. | 705/26 |
| 2002/0045154 A1 | 4/2002 | Wood et al. | |
| 2002/0046139 A1 * | 4/2002 | Ozaki et al. | 705/27 |
| 2003/0018915 A1 | 1/2003 | Stoll | |
| 2003/0131055 A1 * | 7/2003 | Yashchin et al. | 709/204 |
| 2003/0144843 A1 * | 7/2003 | Belrose | 704/270.1 |
| 2004/0111479 A1 * | 6/2004 | Borden et al. | 709/206 |
| 2005/0097364 A1 * | 5/2005 | Edeki et al. | 713/201 |
| 2005/0177528 A1 * | 8/2005 | Qamar | 705/404 |
| 2006/0069955 A1 * | 3/2006 | Oka et al. | 714/25 |
| 2007/0198849 A1 * | 8/2007 | Mozer | 713/186 |
| 2007/0288394 A1 * | 12/2007 | Carrott | 705/78 |

* cited by examiner

METHOD AND SYSTEM FOR CANDIDATE MATCHING

CROSS-REFERENCE TO RELATED APPLICATIONS

The present application is a continuation of U.S. application Ser. No. 12/902,061, filed Oct. 11, 2010, which is a continuation of U.S. application Ser. No. 11/159,484, filed Jun. 22, 2005 (now U.S. Pat. No. 7,813,917), which claims priority to U.S. Provisional Appl. No. 60/582,231, filed Jun. 22, 2004; the disclosures of each of the above-referenced applications are incorporated by reference herein in their entireties.

BACKGROUND OF THE INVENTION

1. Field of the Invention

The present invention relates to methods and systems for candidate matching, for example, such as used by dating or recruiting services to select candidates for service users.

2. Description of the Related Art

Various methods and systems for candidate matching are known in the art, often in the context of a service for selecting candidates for mates, employees, or other personal or business relationships. For example, on-line dating systems are a well-known form of candidate-matching system, and have grown in economic importance in recent years. On-line dating systems may be considered an example of peer-to-peer matching, in that candidates for matches may themselves be screening other users of the system, even while being screened themselves. Such systems typically involve the creation of a personal "ad," which essentially comprises a database record containing user-provided information, such as, for example, a self-assessment of the user's characteristics and qualities, a narrative description of the user and/or the desired candidate, and one or more digital images. The ad is incorporated in a database of candidates, and made available for searching using a database query method. When a user query specifies attributes that are matched by the ad, the ad is presented to the querying user, often in a ranked relationship to other ads.

On-line dating systems, and the like, offer convenient access to large pools of prospective candidates, but suffer from a commonly-recognized credibility problem. Often, personal ads do not contain entirely truthful information concerning candidates' personal characteristics. For example, many ads do not correctly state the submitting candidate's age or educational background. Consequently, the reliability of the system for matching candidates with similar qualities is compromised.

One approach for increasing the reliability of candidate profile information involves independent verification of submitted information. However, reliable independent verification requires consent of the persons submitting information, and is relatively inconvenient and costly. Such factors tend to discourage persons from participating, thereby reducing the pool of available candidates.

It is desirable, therefore, to provide a method and system for candidate matching, which makes use of more reliable information from candidates for matching purposes, without creating appreciably greater cost or inconvenience than unverified systems.

SUMMARY OF THE INVENTION

The present invention makes more reliable information available for querying and matching of prospective candidates. The invention need not change the level of convenience to the user, and should be relatively inexpensive for system operators to implement. Using the invention, a person may search for users with certain personal attributes, for example, educational background, with a greater confidence that the candidates presented will have the requested attribute. In addition, or in the alternative, users may search for candidates using separately-determined criteria, for example, estimated IQ or personality type.

In an embodiment of the invention, submitting candidates are presented with opportunities to provide narrative descriptions related to any topic. In many existing applications, it is customary for prospective candidates to provide narrative that is appropriate for the type of candidacy at issue. For example, for a match-making application, the user may provide a narrative description of herself and of the type of person she is interested in meeting. For a recruiting application, the candidate might provide a narrative description of the preferred working environment and personal qualities that make him a desirable candidate. Requests for narrative information on customary topics will generally be regarded as a normal and expected part of a candidate-matching system, and customary topics may therefore be preferable. However, the invention is not limited to the collection of narrative on customary topics, and narrative may be collected on any topic, including randomly-selected topics.

The selected topic is not a critical feature, because invention need not make use of the information that is directly stated by the collected narratives. Instead, the invention analyzes the provided narrative to develop one or more metrics concerning the manner in which the narrative is expressed. For example, algorithms may be used to score the provided narrative on the basis of vocabulary employed, grammar, spelling, and sentence structure. More sophisticated algorithms may be employed to make use of these and other factors to provide estimates of IQ, educational level, language proficiency, personality type, or other parameters of interest. Any suitable method of writing analysis may be used. Results of the writing analysis may be collected in a database, in association with the candidate profile.

The analyzed metrics may then be used in formulating query responses in various different ways. For example, users may be permitted to specify queries that make direct use of the metrics developed from the writing analysis. For example, a user may be able to specify that a certain level of writing ability is desired, such as "greater than high school" but "less than post-graduate." In the alternative, or in addition, users may specify other parameters that are candidate-supplied, for example, age, education level, and languages spoken, and the metrics from the writing analysis may be applied to gauge the reliability of the candidate-supplied answers. Results may be ranked in order of reliability, and/or a reliability estimate may be provided as a graphical indicator, or in a textual field.

A more complete understanding of the method and system for candidate matching will be afforded to those skilled in the art, as well as a realization of additional advantages and objects thereof, by a consideration of the following detailed description of the preferred embodiment. Reference will be made to the appended sheets of drawings which will first be described briefly.

DETAILED DESCRIPTION OF THE PREFERRED EMBODIMENT

Figure 1:
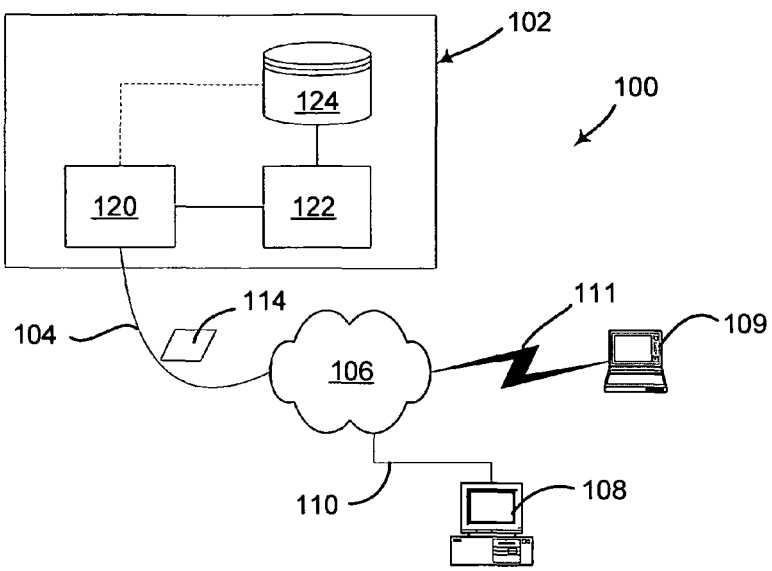
FIG. 1 is a schematic diagram showing an exemplary system for candidate matching according to the invention.

The invention provides a system and method for candidate matching, that is suitable for implementation using various computer and network components as are known in the art. FIG. 1 illustrates one exemplary system 100 according to the invention, in schematic fashion. System 100 comprises a data management system 102, connected via one or more communication links 104 to a wide area network 106, such as the internet. A plurality of client devices 108, 109 (two of many shown) are also connected via any suitable communication links 110, 111 to WAN 106. Any suitable network client may be used.

Data management system 102 comprises a user interface module 120, configured to control communication with clients 108, 109 desiring access to candidate data in database 124. Module 120 may provide security and convenience features as known in the art. For example, module 120 may be used to control access to database 124 using access control methods as known in the art, and may serve interactive pages with graphical elements, for example, HTML and/or XML pages, to network clients.

Subsystem 102 further comprises a data processing module 122, configured to operate writing analysis algorithms, and other operations for carrying out the steps of the invention. In the alternative, modules 120 and 122 may be combined into a single integrated module, and/or may be made up of numerous smaller modules for carrying out the steps and functions herein described. The computing modules may be configured to operate in any number of interconnected computers, or may reside in a single computer. Any suitable computing hardware or software may be used. Steps of the invention may be performed using application software operating in a memory of system 102.

Module 122 may operate a variety of processing operations on data received for entry into database 124. For example, client 108 may provide candidate data 114 by filling out one or more data entry forms, served from interface module 120. The data 114 may be routed to module 122 for processing. In particular, narrative writing portions of data 114 may be analyzed using algorithms as described in more detail below. One or more metrics are obtained from the analysis. Each metric may represent one or more measurements of an objective quality present in the analyzed writing sample, such as, for example, educational level, error rate, estimated IQ, age, or personality type. Any desired metric may then be stored with other candidate data in database 124. Candidate data and metrics may be used for candidate matching in a conventional manner, or in any other manner described herein. Database query and matching methods are well known in the art, and any suitable method may be used.

Figure 2:
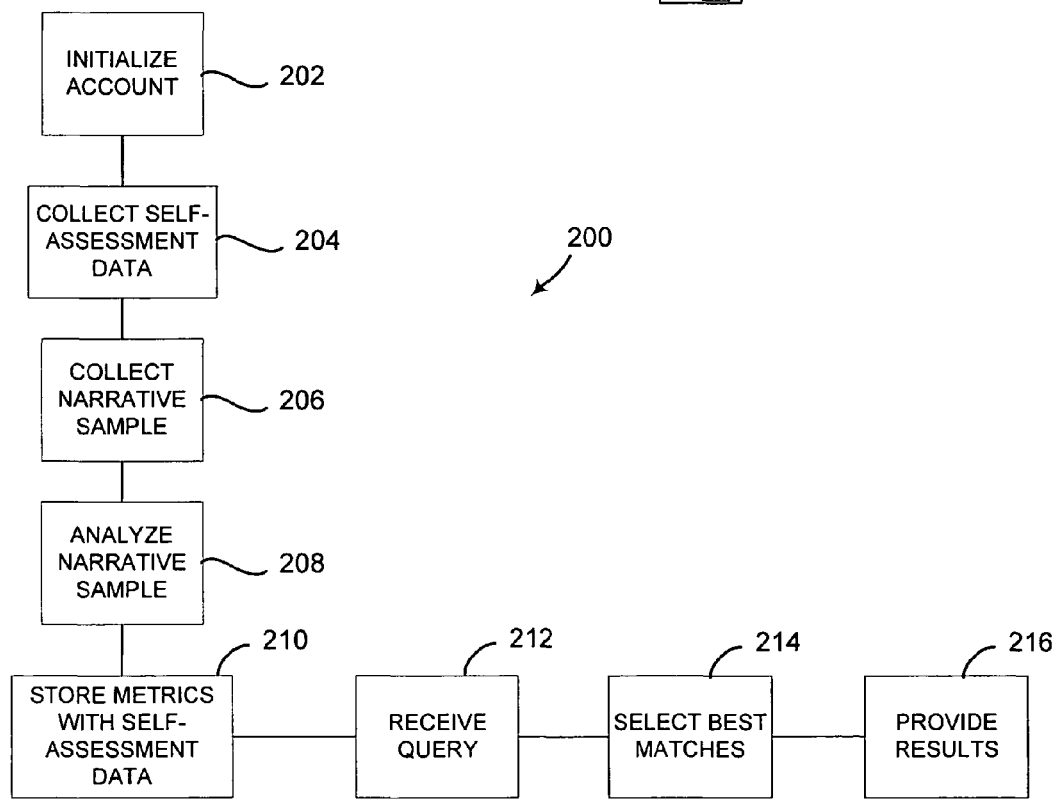
FIG. 2 is a flow diagram showing exemplary steps of a method according to the invention.

FIG. 2 shows exemplary steps of a method 200 for candidate matching according to the invention, which may be performed using a system such as management system 102 connected to other elements of a network system 100. Method 200 is diagrammed in the context of a single set of interactions, but it should be apparent that the method may readily be scaled to multiple parallel operations for a large plurality of simultaneous system users.

An early stage of client interaction may comprise an account initialization step 202. At step 202, a data management system and a client communicate to set up a client account, as part of a control and/or payment scheme. Typically, account initialization includes communication of contractual and personal data for establishing a relationship with the user (operating from a network client), upon which the user's access rights to candidate data are determined. Various suitable methods for account initialization are known in the art.

At step 204, self-assessment data may be collected as known in the art. Such data may comprise information relevant to the candidacy at issue, that is provided by the user without verification. For example, in a match-making service context, self-assessment data may include a user's age, gender, height, weight, ethnicity, education level, location of residence, profession, and any of numerous other personal parameters that may be of interest to a person screening a database of dating candidates for a prospective match. Method 200 is not limited to any particular set of self-assessment parameters or data collection method.

At step 206, one or more narrative samples are collected. For example, the user may supply one or more narrative written responses to particular questions. As previously described, the questions may concern topics commonly associated with the candidacy at hand, or may deal with more randomly selected topics. That is, narrative topics may also serve to gather substantive information from users, or merely to provide a sample for analysis. For example, in the context of a personal match-making service, a narrative may concern a description of the user and the user's interests. To prevent plagiarism of narrative responses, the sample may include one or more responses to a randomly selected topic. Users may be encouraged to provide narratives of sufficient length for analysis, such as by rewarding candidates that provide sufficiently long narratives with special privileges. For example, candidates that provide sufficiently long narratives may be ranked higher in search results than candidates with short or missing narratives, or flagged with a confidence indicator.

The sample or samples need not be written, as spoken narratives may also be suitable. Spoken narratives may be converted to text before analysis, and/or may be analyzed as audio data. Methods for collecting written and audio data using a wide area network connection are well known in the art.

At step 208, the narrative sample is analyzed using one or more algorithms, to determine candidate qualities unrelated to the topic, or with no necessary relationship to the topic. For example, a narrative concerning the candidates last vacation or favorite leisure activities may be analyzed to assess the candidates apparent educational or literacy level. This analysis is not a mere subjective impression, and comprises application of a defined objective algorithm to the narrative text using any suitable text-processing method. The qualities thus measured are therefore actually qualities of the text itself, from which an inference or inferences may be drawn about the candidate. For example, if the narrative has a textual quality indicating authorship by a native English-speaking, university-educated person, it may be inferred that the author of the narrative possesses these qualities.

Various computerized analysis methods are known, and any suitable method may be used. For example, the narrative information may be analyzed as belonging to a particular educational level, based on the frequency with which certain words occur. For further example, the rate at which syntactical, grammatical, and/or spelling errors occur in the narrative may be analyzed. More complex analysis such as used in personality profiling may also be used. The invention is not limited to any particular analysis method, and any method that is believed to provide information of interest about the author of the narrative may be used. In the context of a personal match-making service, for example, a user's chosen vocabulary may be analyzed to determine a probable gender, age, and/or ethnic or cultural origin, as well as educational background.

One or more metrics should result from the analysis at step 208. Any desired metric may be used. In many cases, although the analysis itself is objective and deterministic, the metric may be of a probabilistic nature, such as indicating a probability that a quality of interest is present in the contributing candidate, and may include a level-of-confidence indicator of the estimated result.

At step 210, the resulting metrics may be stored in association with self-assessment data in a candidate database. In addition, self-assessment data may be compared with the metrics and assigned a quality rating. For example, if a user's self-reported educational background conflicted with an educational metric from the narrative sample, this conflict may be noted as a separate piece of information in the database.

At step 212, a query seeking a report of qualified candidates may be received from a user. For example, a user may fill out a query form on an web page, which then generates a database query to the candidate database. At step 214, any suitable database method may be used to select the best matching methods. While the database querying methods may be as known in the art, the data queried should include novel types of information as disclosed herein. In particular, novel metrics based on analysis of written data are available for use in selecting the most desirable candidates. Candidates with excellent consistency between self-assessment and metric data may be ranked higher, or flagged with an indicator. Candidates with poor consistency or inadequate narrative data for reliable metrics may receive lower rankings, or be omitted from the search results. At step 216, query results may be presented to the user in a conventional fashion.

The invention is not limited to candidate matching for natural persons. It may also be used to identify other information of interest, so long as the information includes a basis for drawing inferences about the quality of the information. For example, certain keyword searches used in search engines, e.g., "breast implants," may identify a great deal of spurious information that would not be of interested to someone seeking academic or serious medical information on this topic. A casual searcher may not be knowledgeable enough to specify academic or technical terms relating to the subject, but nonetheless, desires to see a higher (or lower) level of information than the search engine would otherwise return. In an embodiment of the invention, therefore, the invention may be adapted to screen search engine results to determine a similar sorts of information as disclosed herein for personal candidate information. For example, similar metrics may be applied to determine a quality of a search result, and the results may be screened to exclude results lacking a specified quality or range of qualities. Likewise, search results with excellent consistency between a self-reported quality level and a measured quality level may be flagged or otherwise identified favorably in search results.

Having thus described a preferred embodiment of method and system for candidate matching, it should be apparent to those skilled in the art that certain advantages of the within system have been achieved. It should also be appreciated that various modifications, adaptations, and alternative embodiments thereof may be made within the scope and spirit of the present invention. For example, an application to a match-making service has been illustrated, but it should be apparent that the inventive concepts described above would be equally applicable to other applications for candidate matching. The invention is defined by the following claims.

What is claimed is:

1. A method, comprising:
receiving, by a computing device, a set of information descriptive of a user;
receiving, by the computing device, narrative information associated with the user; and
validating, by the computing device, at least one item in the set of information based on an analysis of the narrative information.

2. The method of claim 1, wherein the narrative information comprises audio information.

3. The method of claim 1, wherein the set of information comprises biographical information about the user.

4. The method of claim 3, wherein the validating includes determining, using the analysis of the narrative information, whether the biographical information about the user in the set of information is accurate.

5. The method of claim 1, wherein the set of information includes an indicated age of the user, and wherein the validating includes analyzing the narrative information to determine whether the indicated age of the user is accurate.

6. The method of claim 1, wherein the set of information includes an indicated education level of the user, and wherein the validating includes analyzing the narrative information to determine whether the indicated education level of the user is accurate.

7. The method of claim 1, wherein the validating includes determining a deviation between the set of information and the analysis of the narrative information.

8. The method of claim 1, wherein the set of information and the narrative information are received from the user.

9. A non-transitory computer-readable storage medium having instructions stored thereon that, if executed by a computing device, cause the computing device to execute operations comprising:
receiving a set of information associated with an individual;
receiving narrative information associated with the individual; and
determining accuracy of at least one data item in the set of information based on an analysis of the narrative information.

10. The non-transitory computer-readable storage medium of claim 9, wherein the determining includes making a determination of language proficiency of the individual.

11. The non-transitory computer-readable storage medium of claim 9, wherein the determining includes making a determination of an intelligence level of the individual.

12. The non-transitory computer-readable storage medium of claim 9, wherein the narrative information includes audio data, and wherein the determining includes analyzing the audio data in the narrative information.

13. The non-transitory computer-readable storage medium of claim 9, wherein the operations further comprise determining a reliability associated with the determined accuracy of the at least one data item.

14. The non-transitory computer-readable storage medium of claim 9, wherein the operations further comprise storing a profile associated with the individual in an entry in a candidate database, wherein the entry includes information regarding the determined accuracy of the at least one data item.

15. The non-transitory computer-readable storage medium of claim 14, wherein the operations further comprise:
accepting a query for candidates listed in the candidate database; and evaluating the query using the information regarding the determined accuracy of the at least one data item that is stored in the entry for the individual.

16. A method, comprising:
receiving, by a computer system, self-assessment data for a plurality of users indicating whether each user possesses a quality of interest;
receiving, by the computer system, narrative samples for one or more of the plurality of users;
analyzing, by the computer system, one or more of the narrative samples, wherein the analyzing results in one or more metrics indicative of whether the quality of interest is possessed by a particular user; and
storing, at a location accessible to the computer system, the self-assessment data along with the one or more metrics resulting from the analyzing.

17. The method of claim 16, further comprising:
receiving, by the computer system, a query for those ones of the plurality of users that match a specified list of qualities;
selecting one or more of the plurality of users that best match the specified list of qualities; and
presenting one or more of the selected users in response to the query.

18. The method of claim 17, wherein the specified list of qualities includes a desired education level.

19. The method of claim 16, wherein the quality of interest is a specified personality type.

20. The method of claim 16, wherein one or more of the narrative samples is related to a topic randomly selected by the computer system.

21. A method, comprising:
receiving, by a computing device, narrative information associated with a user; and
based on an analysis of the narrative information, the computing device assigning a reliability indicator to personal information received from the user.

22. The method of claim 21, wherein the narrative information and the personal information are received from the user.

23. The method of claim 21, further comprising the computing device performing the analysis of the narrative information, wherein the analysis includes determining qualities of text in the narrative information.

24. The method of claim 21, wherein the personal information includes an indicated age of the user, and wherein the analysis includes determining a reliability indicator for the user's indicated age.

25. A method, comprising:
receiving, by a computing device, narrative information associated with a candidate;
analyzing, by the computing device, the narrative information to determine a reliability indication for a characteristic of the candidate received from the candidate; and
storing, in a location accessible to the computing device, the reliability indication for the characteristic along with an indicated value for the characteristic.

26. The method of claim 25, wherein the candidate is an individual.

27. The method of claim 26, further comprising receiving, at the computer system, the indicated value for the characteristic, wherein the indicated value is received from the candidate.

* * * * *